May 1, 1951  A. W. BARTOE  2,551,483
VEHICLE WHEEL DOLLY

Filed March 23, 1948  2 Sheets-Sheet 1

Inventor
Albert W. Bartoe

By *Clarence A. O'Brien and Harvey B. Jacobson*
Attorneys

May 1, 1951 A. W. BARTOE 2,551,483
VEHICLE WHEEL DOLLY
Filed March 23, 1948 2 Sheets-Sheet 2

Inventor
Albert W. Bartoe

By *Clarence A. O'Brien and Harvey B. Jackson*
Attorneys

Patented May 1, 1951

2,551,483

UNITED STATES PATENT OFFICE 2,551,483

VEHICLE WHEEL DOLLY

Albert W. Bartoe, Monongahela, Pa., assignor of fifty per cent to Armand F. Hoeble, Mount Lebanon, Pa.

Application March 23, 1948, Serial No. 16,445

2 Claims. (Cl. 254—8)

The present invention relates to new and useful improvements in dollies to facilitate removal of a wheel from a motor vehicle and for replacing the wheel with a minimum of manual effort.

An important object of the invention is to provide a vehicle wheel dolly by means of which the wheel of an automobile, truck, bus or the like may be supported during its removal from the vehicle and supported on the dolly while being moved to a place of repair.

A further object of the invention is to provide a dolly having a wheel supporting tray pivoted thereon and a lever attached to the tray and by means of which the wheel may be manually raised or lowered for maneuvering the same into an aligned position with the vehicle axle while removing or replacing the wheel thereon.

A still further object is to provide a device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
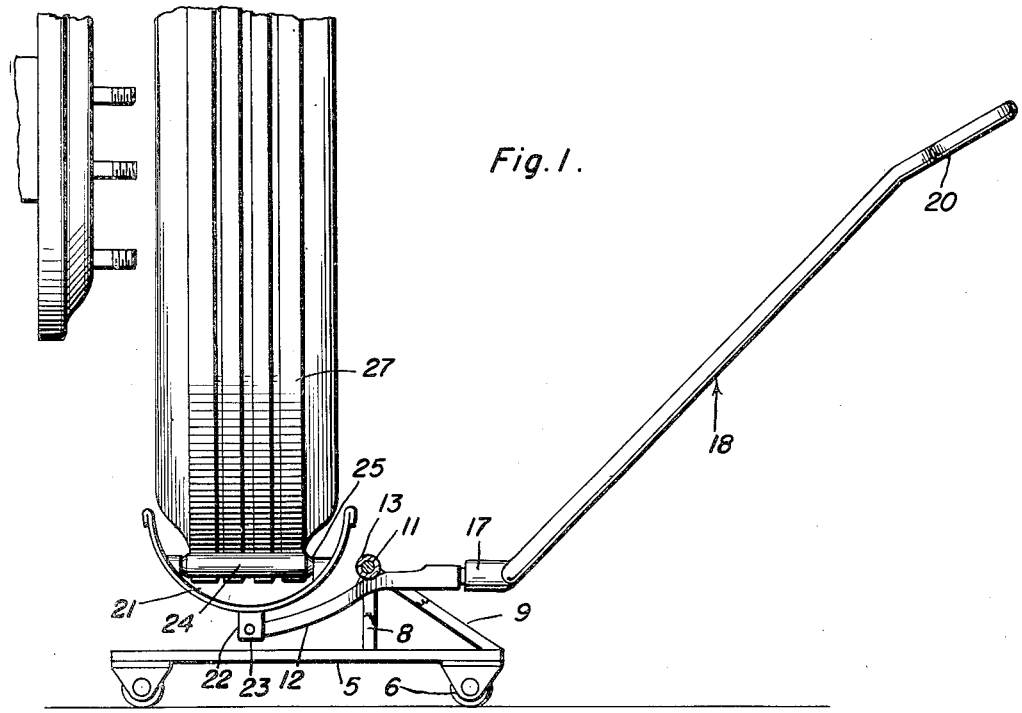
Figure 1 is a side elevational view showing a vehicle wheel supported on the dolly.
Figure 6:
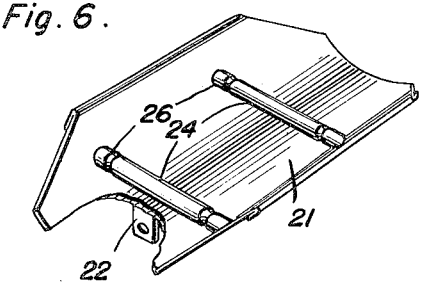
Figure 6 is a perspective view of the wheeled supporting tray with parts broken away and shown in section.
Figure 5:
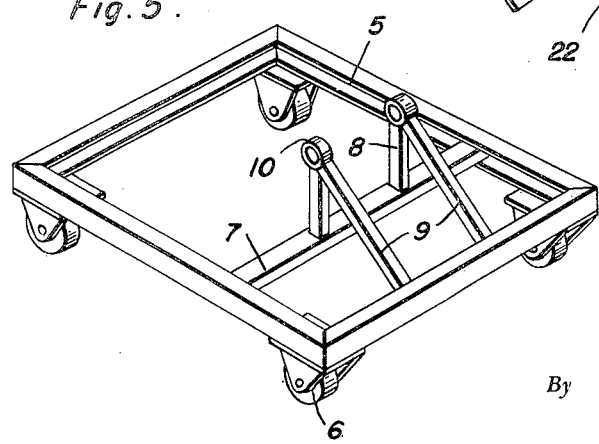
Figure 5 is a perspective view of the dolly frame.
Figure 2:
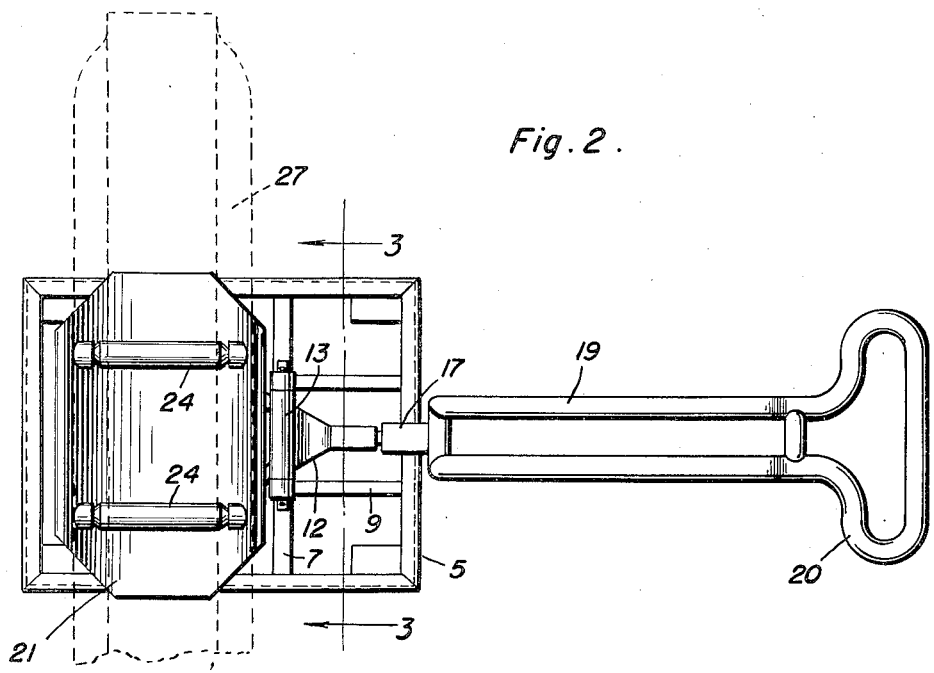
Figure 2 is a top plan view.
Figure 4:
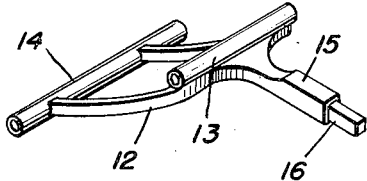
Figure 4 is a perspective view of the lifting fork.
Figure 3:
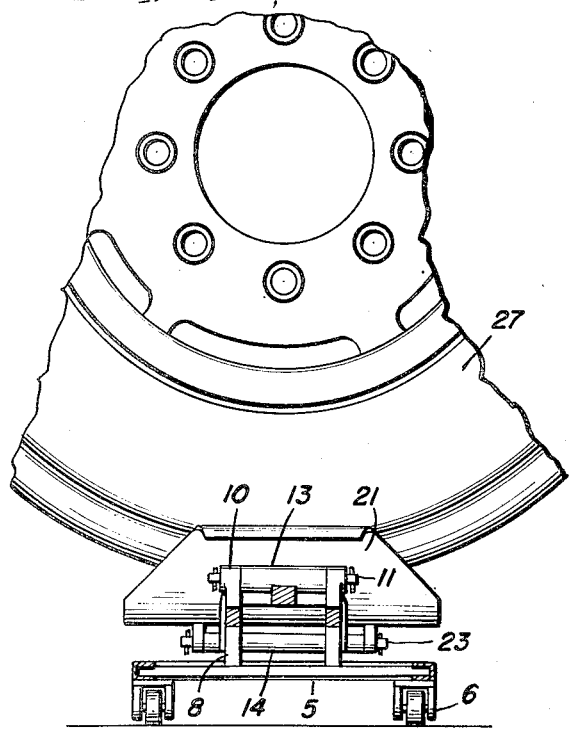
Figure 3 is an enlarged transverse sectional view taken substantially on a line 3—3 of Figure 2.

Referring now to the drawings in detail wherein, for the purpose of illustration, I have disclosed a preferred embodiment of the invention, the numeral 5 designates a dolly frame which may be of square or rectangular shape and constructed of channel iron or other suitable frame members. Wheels 6 are mounted for swivel movement at the corners of the frame.

A crossbar 7 is suitably secured at its ends to the sides of the frame with a pair of posts 8 rising from the crossbar and having braces 9 extending from the upper portion of the posts to one of the end frame members. Bearings 10 are provided at the upper ends of the posts for receiving a pin 11 extending transversely of the frame.

A lifting fork 12 is provided with rear and front transversely extending sleeves 13 and 14 suitably secured to the fork in spaced parallel relation with respect to each other, the sleeve 13 being mounted on pin 11 between the posts 8 for vertical pivotal movement of the fork.

The inner end of the fork is formed with a square-shaped shank 15 having a reduced square-shaped extension 16 for insertion in a complementary shaped socket 17 at the front end of a handle, designated generally at 18. The handle 18 is constructed of a pair of spaced parallel bars 19 having their outer ends curved outwardly and connected to each other to form a seat 20 and which also provides an enlarged hand grip.

A trough-shaped sheet metal wheel supporting tray 21 is provided with a pair of downwardly extending apertured lugs 22 at its underside for pivotal mounting on a transverse pin 23 supported in the front sleeve 14 of the fork 12, the pin 23 extending longitudinally of the tray to support the tray transversely of the dolly frame 5.

A pair of rollers 24 are positioned transversely of the tray and formed with conical ends 25 journaled in bearings 26 suitably secured to the upper surface of the tray.

In the operation of the device, the dolly frame 5 is moved into a position under a vehicle wheel 27 by manipulating the handle 18, a downward pressure on the rear end of the handle raising the wheel supporting tray 21 under the wheels, to thus hold the wheel while being removed from a vehicle, the wheel then being balanced on the tray by one hand of the operator or by an assistant.

The device may be used by a single person, if desired, who occupies a straddling position on handle 18 and seated on seat 20 to exert a downward pressure on the handle for raising tray 21 while the hands of the person are used to balance the wheel 27 on the tray and to guide the wheel while removing or replacing the same on the vehicle.

After the wheel has been removed, the tray 21 may be lowered onto frame 5 to relieve the operator of the weight thereof.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A vehicle wheel dolly comprising a dolly frame, a pair of posts rising from the frame, a horizontal pin supported on said posts, a fork having front and rear transverse sleeves, said rear sleeve being rockably supported on said pin, a trough-shaped member having a pin under its bottom rockably mounted in the front sleeve of the fork for supporting a vehicle wheel, a pair of rollers journaled transversely on top of the member, and a handle at the rear end of the fork.

2. A vehicle wheel dolly comprising a dolly frame, a pair of posts rising from the frame, a horizontal pin supported on said posts, a fork having a rear transverse sleeve rockably supported on said pin between said posts, a wheel supporting trough-shaped member having a pair of downwardly extending ears at its ends, a pin supported in said ears, a front transverse sleeve on the fork rockably mounted on said last-named pin between said ears, and a handle at the rear end of the fork.

ALBERT W. BARTOE.

REFERENCES CITED

The following references are of record in the file of this patent:

UNITED STATES PATENTS

| Number | Name | Date |
|---|---|---|
| 2,044,363 | Morse et al. | June 16, 1936 |
| 2,150,503 | Hawkins | Mar. 14, 1939 |
| 2,205,746 | Judge | June 25, 1940 |
| 2,345,458 | Caron | Mar. 28, 1944 |